United States Patent
Nagasaki et al.

(10) Patent No.: US 11,698,504 B2
(45) Date of Patent: Jul. 11, 2023

(54) OPTICAL CONNECTOR CABLE AND METHOD FOR MANUFACTURING OPTICAL CONNECTOR CABLE

(71) Applicant: SUMITOMO ELECTRIC INDUSTRIES, LTD., Osaka (JP)

(72) Inventors: Taisuke Nagasaki, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/495,896

(22) Filed: Oct. 7, 2021

(65) Prior Publication Data

US 2022/0146774 A1 May 12, 2022

(30) Foreign Application Priority Data

Nov. 6, 2020 (JP) ................................ 2020-185924

(51) Int. Cl.
*G02B 6/44* (2006.01)
*H01B 11/22* (2006.01)

(52) U.S. Cl.
CPC ............ *G02B 6/4486* (2013.01); *H01B 11/22* (2013.01)

(58) Field of Classification Search
None
See application file for complete search history.

(56) References Cited

U.S. PATENT DOCUMENTS

| | | | | |
|---|---|---|---|---|
| 4,447,120 A | 5/1984 | Borsuk | | |
| 4,948,222 A | 8/1990 | Corke et al. | | |
| 5,231,685 A * | 7/1993 | Hanzawa | ............. | G02B 6/4292 385/139 |
| 10,684,429 B2 | 6/2020 | Inoue et al. | | |
| 2006/0257079 A1* | 11/2006 | Ohtsuka | ............... | G02B 6/3839 385/86 |
| 2013/0209043 A1* | 8/2013 | Norris | ................... | G02B 6/3888 385/80 |
| 2015/0010273 A1* | 1/2015 | Oyagi | ................... | G02B 6/4284 385/33 |
| 2016/0124174 A1* | 5/2016 | Courchaine | .......... | G02B 6/4472 29/428 |
| 2019/0121034 A1 | 4/2019 | Nagasaki et al. | | |
| 2019/0353861 A1 | 11/2019 | Nagasaki et al. | | |

FOREIGN PATENT DOCUMENTS

| | | |
|---|---|---|
| JP | 2019-078776 A | 5/2019 |
| JP | 2019-200385 A | 11/2019 |

* cited by examiner

*Primary Examiner* — Chad H Smith
(74) *Attorney, Agent, or Firm* — Oliff PLC

(57) ABSTRACT

An optical connector cable including an optical cable, a first resin member, and a second resin member is disclosed. The optical cable includes a plurality of optical fibers and a sheath surrounding the plurality of optical fibers. End portions of the plurality of optical fibers extend to the outside from an end surface of the sheath. The first resin member holds the end portions of the plurality of optical fibers extending to the outside from the end surface of the sheath. The second resin member covers at least a part of the first resin member and an end portion of the sheath.

18 Claims, 9 Drawing Sheets

OPTICAL CONNECTOR CABLE AND METHOD FOR MANUFACTURING OPTICAL CONNECTOR CABLE

CROSS-REFERENCE TO RELATED APPLICATIONS

This application is based upon and claims the benefit of priority from Japanese Patent Application No. 2020-185924, filed on Nov. 6, 2020, the entire contents of which are incorporated herein by reference.

TECHNICAL FIELD

The present disclosure relates to an optical connector cable and a method for manufacturing an optical connector cable.

BACKGROUND

JP2019-200385A discloses an example of an optical connector cable. The optical connector cable includes an optical cable, a metal member, and a resin member. The optical cable has optical fibers extending in an X axis direction, tensile strength fibers provided along the optical fibers, and a sheath surrounding the optical fibers and the tensile strength fibers. The optical fibers and the tensile strength fibers extend outward from one end of the sheath. The metal member has a winding structure around which the tensile strength fibers extending outward from the one end of the sheath are wound. The resin member holds the optical fibers extending outward from the one end of the sheath and the metal member. The winding structure of the metal member is embedded inside the resin member. JP2019-078776A discloses another example of an optical connector cable.

SUMMARY

An optical connector cable of the present disclosure includes an optical cable, a first resin member, and a second resin member. The optical cable includes a plurality of optical fibers and a sheath surrounding the plurality of optical fibers. End portions of the plurality of optical fibers extend to the outside from an end surface of the sheath. The first resin member holds the end portions of the plurality of optical fibers extending to the outside from the end surface of the sheath. The second resin member covers at least a part of the first resin member and an end portion of the sheath.

A method for manufacturing an optical connector cable of the present disclosure includes preparing an optical cable including a plurality of optical fibers and a sheath surrounding the plurality of optical fibers, wherein end portions of the plurality of optical fibers extend to the outside from an end surface of the sheath, disposing the end portions of the plurality of optical fibers extending to the outside from the end surface of the sheath inside a first mold, molding a first resin member that holds the end portions of the plurality of optical fibers by filling the inside of the first mold with a molding resin, disposing at least a part of the first resin member and an end portion of the sheath inside a second mold, and molding a second resin member that covers at least a part of the first resin member and the end portion of the sheath by filling the inside of the second mold with a molding resin.

BRIEF DESCRIPTION OF THE DRAWINGS

The foregoing and other purposes, aspects and advantages will be better understood from the following detailed description of embodiments of the disclosure with reference to the drawings, in which.

DETAILED DESCRIPTION

Figure 1:
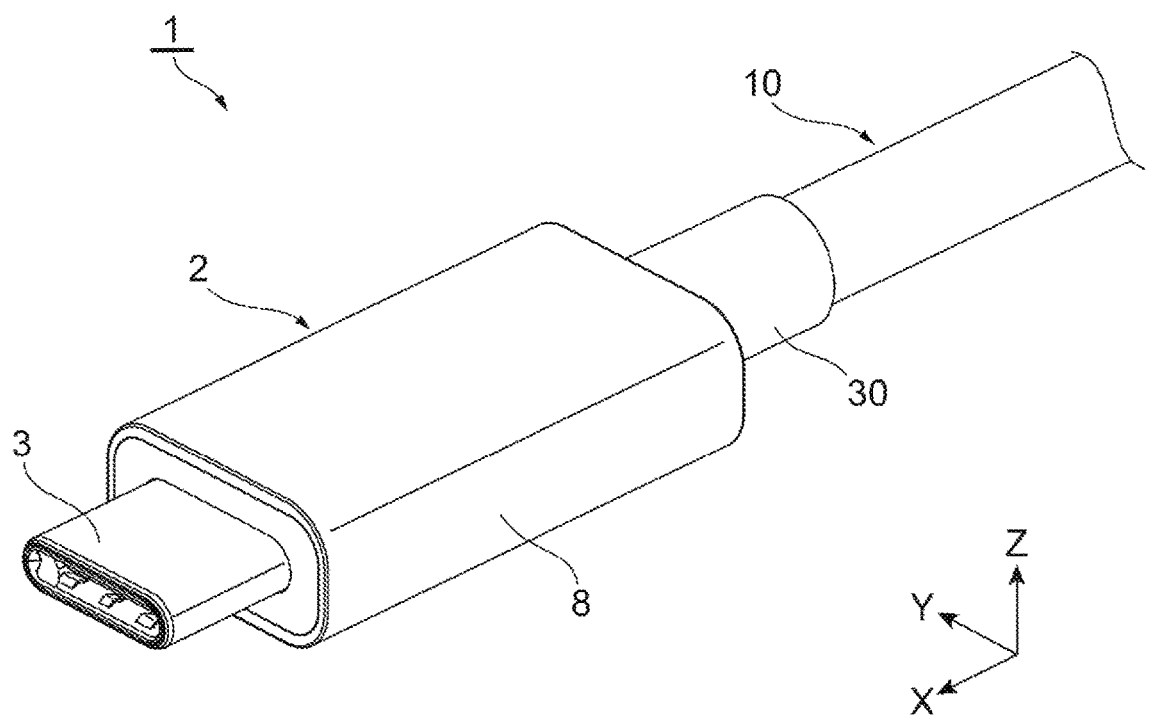
FIG. 1 is a perspective view illustrating an end portion of an optical connector cable according to an embodiment.

Problem to be Solved by Present Disclosure

A resin member for an optical connector cable in the related art is sometimes molded using a hard material in order to prevent optical fibers from coining out from the resin member when the optical connector cable is pulled. When a resin member is molded using a hard material, there is concern that the resin member is unlikely to be deformed and a sheath of an optical cable or optical fibers therein are damaged when an optical connector cable is bent. Alternatively, when a resin member is molded using a soft material in order to prevent damage due to bending, optical fibers are likely to come out from the resin member. Thus, there is demand for a technology capable of preventing from breakage of an optical connector cable due to pulling and bending.

Effects of Present Disclosure

According to the present disclosure, it is possible to prevent from breakage of an optical connector cable due to pulling and bending.

Description of Embodiment of Present Disclosure

First, details of an embodiment of the present disclosure will be enumerated and described. An optical connector cable according to the embodiment includes an optical cable, a first resin member, and a second resin member. The optical cable includes a plurality of optical fibers and a sheath surrounding the plurality of optical fibers. End portions of the plurality of optical fibers extend to the outside from an end surface of the sheath. The first resin member holds the end portions of the plurality of optical fibers extending to the outside from the end surface of the sheath. The second resin member covers at least a part of the first resin member and an end portion of the sheath.

The above optical connector cable can prevent from breakage of the optical connector cable due to pulling and bending by combining different materials of the first resin member and the second resin member.

As one embodiment, the second resin member may have a Young's modulus smaller than a Young's modulus of the first resin member. According to this embodiment, the end portions of the plurality of optical fibers extending to the outside from the end surface of the sheath are held by the first resin member having a greater Young's modulus. Accordingly, the first resin member holding the end portions of the optical fibers is unlikely to be deformed when the optical connector cable is pulled. Therefore, the optical fibers are unlikely to come out from the first resin member. Meanwhile, at least a part of the first resin member and the end portion of the sheath are covered by the second resin member having a smaller Young's modulus. Accordingly, since the second resin member which is softer than the first resin member and is likely to be deformed contacts with the sheath of the optical cable when the optical connector cable is bent, damage to the sheath of the optical cable and the optical fibers accommodated inside the sheath is prevented. That is, breakage of the optical connector cable due to pulling and bending can be prevented by forming resin members to be attached to the end portion of the optical cable using a plurality of resin members having different Young's moduli.

As one embodiment, the first resin member may include a first tube surrounding the end portions of the plurality of optical fibers extending to the outside from the end surface of the sheath. An end surface of the first tube may contacts with the end surface of the sheath. The second resin member may include a second tube surrounding a contact part between the end surface of the first tube and the end surface of the sheath. According to this embodiment, not only the end surface of the first tube surrounding the optical fibers and the end surface of the sheath come into contact with each other, but the contact part between the end surfaces thereof is also covered by the second resin member. Accordingly, this embodiment can reduce exposed parts of the optical fibers, and thus can prevent damage to the optical fibers.

As one embodiment, the first resin member may have a Young's modulus within a range of 250 MPa to 1,000 MPa. The second resin member may have a Young's modulus within a range of 10 MPa to 150 MPa. According to this embodiment, since the first resin member is a resin member which has a relatively greater Young's modulus and is unlikely to be deformed, the optical fibers are unlikely to come out from the first resin member when the optical connector cable is pulled. Meanwhile, since the second resin member is a soft resin member which has a relatively smaller Young's modulus, the sheath of the optical cable and the optical fibers inside the sheath are unlikely to be damaged when the optical connector cable is bent. Thus, this embodiment can prevent breakage of the optical connector cable due to pulling and bending.

As one embodiment, the first resin member may be made of a nylon resin. The second resin member may be made of a polyvinyl chloride resin. According to this embodiment, since the first resin member is molded of a nylon resin which is unlikely to be deformed, the optical fibers are unlikely to come out from the first resin member when the optical connector cable is pulled. Meanwhile, since the second resin member is molded of a polyvinyl chloride resin which is generally softer than a nylon resin, the sheath of the optical cable and the optical fibers inside the sheath are unlikely to be damaged when the optical connector cable is bent. That is, this embodiment can prevent breakage of the optical connector cable due to pulling and bending.

As one embodiment, the optical connector cable may further include a ring member that surrounds the end portion of the sheath. The ring member may include a projecting portion protruding outward. The second resin member may cover the projecting portion. According to this embodiment, the projecting portion of the ring member is caught by the second resin member, and thus the second resin member can be prevented from falling off from the end portion of the sheath.

In the embodiment, a plurality of projecting portions may be provided in a circumferential direction of the ring member. According to this embodiment, the second resin member can be better prevented from falling off from the end portion of the sheath.

As one embodiment, the second resin member may have a hole configured to expose a part of a surface of the sheath. A bonding portion to fix the second resin member to the sheath may be provided in the hole. According to this embodiment, since the second resin member and the sheath are fixed by the bonding portion, the second resin member can be prevented from falling off from the end portion of the sheath.

In the embodiment, a plurality of holes may be provided in an extending direction of the optical cable. According to this embodiment, bonding agents can be provided in the plurality of holes, and thus the second resin member can be more firmly fixed to the sheath. Accordingly, the second resin member can be better prevented from falling off from the end portion of the sheath.

As one embodiment, the optical cable may further include a plurality of electrical wires. End portions of the plurality of electrical wires may extend to the outside from the end surface of the sheath. The first resin member may hold the end portions of the plurality of optical fibers and the end portions of the plurality of electrical wires. According to this embodiment, the end portions of the electrical wires are held by the first resin member which has a greater Young's modulus than the second resin member and is unlikely to be deformed. Accordingly, the electrical wires are unlikely to come out from the first resin member when the optical connector cable is pulled. Meanwhile, the second resin member is a soft member which has a smaller Young's modulus than the first resin member. Therefore, this embodiment can prevent damage to the electrical wires accommodated in the sheath of the optical cable when the optical connector cable is bent.

A method for manufacturing an optical connector cable according to one embodiment of the present disclosure includes steps of preparing an optical cable including a plurality of optical fibers and a sheath surrounding the plurality of optical fibers, and end portions of the plurality of optical fibers extend to the outside from an end surface of the sheath; disposing the end portions of the plurality of optical fibers extending to the outside from the end surface of the sheath inside a first mold; molding a first resin member that holds the end portions of the plurality of optical fibers by filling the inside of the first mold with a molding resin; disposing at least a part of the first resin member and an end portion of the sheath inside a second mold; and molding a second resin member that covers at least a part of the first resin member and the end portion of the sheath by filling the inside of the second mold with a molding resin.

In this method for manufacturing an optical connector cable, after the first resin member is molded, the second resin member covering at least a part of the first resin member and the end portion of the sheath is subjected to injection molding. Thus, the second resin member is provided such that it adheres to a surface of the first resin member. Accordingly, this method can improve mechanical strength of the optical connector cable.

In the embodiment, the second resin member may have a Young's modulus smaller than a Young's modulus of the first resin member. According to this embodiment, the end portions of the plurality of optical fibers extending to the outside from the end surface of the sheath are held by the first resin member having a greater Young's modulus. Accordingly, the first resin member holding the end portions of the optical fibers is unlikely to be deformed when the optical connector cable is pulled. Therefore, the optical fibers are unlikely to come out from the first resin member. Meanwhile, at least a part of the first resin member and the end portion of the sheath are covered by the second resin member having a smaller Young's modulus. Accordingly, since the second resin member which is softer than the first resin member and is likely to be deformed contacts with the sheath of the optical cable when the optical connector cable is bent, damage to the sheath of the optical cable and the optical fibers accommodated inside the sheath is prevented. That is, this method can prevent breakage of the optical connector cable due to pulling and bending by forming resin members to be attached to the end portion of the optical cable using a plurality of resin members having different Young's moduli.

Details of Embodiment of Present Disclosure

Specific examples of an optical connector cable and a method for manufacturing an optical connector cable according to the present disclosure will be described below with reference to the drawings. The present disclosure is not limited to these examples. The present disclosure is indicated by the claims, and it is intended to include all the changes within meanings and a range equivalent to the claims.

Figure 2:
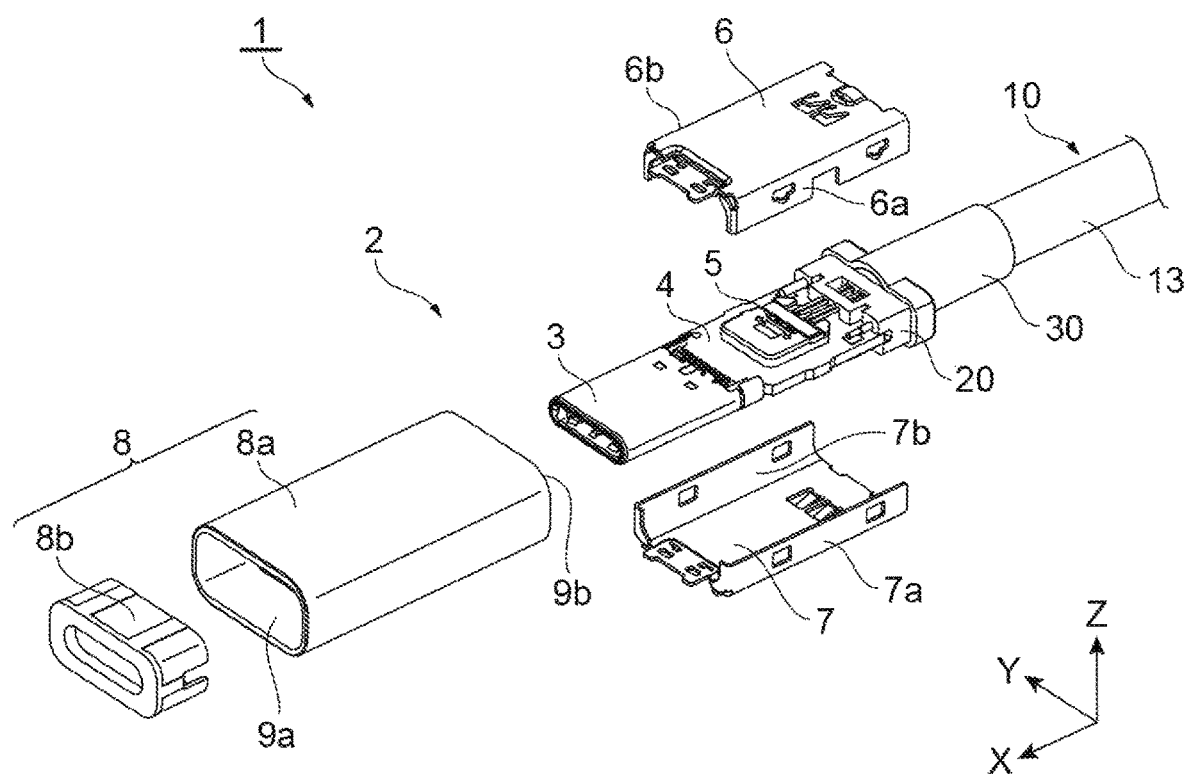
FIG. 2 is an exploded perspective view of the optical connector cable illustrated in FIG. 1.

With reference to FIGS. 1 and 2, an optical connector cable 1 according to an embodiment will be described. FIG. 1 is a perspective view illustrating an end portion of the optical connector cable 1 according to the embodiment. FIG. 2 is an exploded perspective view of the optical connector cable 1 illustrated in FIG. 1. The optical connector cable 1 is used for transmitting and receiving optical signals and electrical signals between devices, for example. The optical connector cable 1 may be an active optical cable (AOC) or may be a plug-sized cable conforming to the standard of USB Type-C.

In FIGS. 1 and 2, one end of the optical connector cable 1 is illustrated. The other end of the optical connector cable 1 may also have a similar constitution or may have a different constitution. As illustrated in FIGS. 1 and 2, the optical connector cable 1 includes a connector module 2 and an optical cable 10. In the following description, an extending direction of the connector module 2 will be referred to as a direction X, a width direction of the connector module 2 will be referred to as a direction Y, and a thickness direction of the connector module 2 will be referred to as a direction Z. In the present embodiment, the direction X, the direction Y, and the direction Z are orthogonal to each other. Description may be given while a distal end of the optical connector cable 1 is referred to as a front side and an opposite side in the direction X is referred to as a rear side.

The connector module 2 is connected to one end portion of the optical cable 10. The connector module 2 has a function of converting optical signals from the optical cable 10 into electrical signals to output the converted signals to the outside, and converting electrical signals from the outside into optical signals to output the converted signals to the optical cable 10. The connector module 2 includes a connector 3, a substrate 4, a lens module 5, accommodation members 6 and 7, and a cover 8.

The connector 3 is a member having a flat shape and is attached to an end portion of the substrate 4. The connector 3 has a size and a shape which can be inserted into a reception port provided in a device to which the optical connector cable 1 is connected. Optical signals transmitted from the optical cable 10 are converted into electrical signals by a photoelectric conversion element (not illustrated) which is mounted on the substrate 4, and the connector 3 sends out the electrical signals to an external device. The connector 3 sends out electrical signals from an external device to the photoelectric conversion element.

The substrate 4 is a plate-shaped member on which various optical elements and electronic elements are mounted. For example, the substrate 4 may be a thin substrate of which the thickness in the direction Z is within a range of 0.2 mm to 1.0 mm. The substrate 4 is formed to have substantially a rectangular shape in a plan view and is disposed such that a longitudinal direction thereof lies in the direction X. The width of the substrate 4 in the longitudinal direction may be within a range of 12 mm to 16 mm, for example. Various wirings (not illustrated) for electrically connecting ICs, electronic elements, and the like may be provided on a surface of the substrate 4 and inside thereof. The wirings provided in the substrate 4 may be electrically connected to a plurality of electrical wires included in the optical cable 10.

The lens module 5 is a plate-shaped component placed on the substrate 4 and is a member optically coupling a plurality of optical fibers included in the optical cable 10 with the photoelectric conversion elements (not illustrated) mounted on the substrate 4. Each of the photoelectric conversion elements performs photoelectric conversion of light incident from a corresponding optical fiber or light emitted to a corresponding optical fiber. The photoelectric conversion element may be a light receiving element such as a photodiode (PD) or a light emitting element such as a vertical cavity surface emitting laser (VCSEL). The photoelectric conversion elements are provided at positions overlapping the lens module 5 in the thickness direction of the substrate 4. Light emitted from each optical fiber in a horizontal direction is converted into light which is propagated in a perpendicular direction by a mirror (not illustrated) provided in the lens module 5, and then the light is incident on the corresponding photoelectric conversion element. On the other hand, light emitted from each photoelectric conversion element in the perpendicular direction is converted into light which is propagated in the horizontal direction by the mirror provided in the lens module 5, and then the light is incident on corresponding optical fiber. At least a part of the lens module 5 is constituted of a transparent material (for example, glass) through which light can be propagated. Most of the lens module 5 can be constituted of the transparent material.

The accommodation members 6 and 7 are housings accommodating the substrate 4, the lens module 5, a first resin member 20, and the like. The accommodation members 6 and 7 may be formed of metals such as steel use stainless (SUS). The accommodation members 6 and 7 are provided such that the substrate 4 is sandwiched from sides thereabove and therebelow, respectively. The accommodation member 6 has a pair of side walls 6a and 6b extending in the direction X. The pair of side walls 6a and 6b face each other in the direction Y. The accommodation member 7 has a pair of side walls 7a and 7b extending in the direction X. The pair of side walls 7a and 7b face each other in the direction Y. The accommodation member 6 is combined with the accommodation member 7 such that the side walls 6a and 6b overlap the side walls 7a and 7b of the accommodation member 7 in the direction Y. Each of the side walls 6a and 6b and the side walls 7a and 7b has an interlock portion (for example, a protrusion portion or a cutout into which the protrusion portion is fitted), and thus the accommodation member 6 can be fixed to the accommodation member 7.

The cover 8 is a case member accommodating the connector 3, the accommodation members 6 and 7, and the like. The cover 8 may be formed of a resin or a metal. The cover 8 has a main body 8a and a cap 8b. The main body 8a is a tubular member and is formed to have substantially a rectangular shape in a cross-sectional view. Apart of the connector 3, the accommodation members 6 and 7, and a part of the first resin member 20 are accommodated inside the main body 8a. The thickness of the main body 8a in the direction Z may be 6.5 mm or smaller. An opening 9a is provided at a front end of the main body 8a, and a rear side wall 9b is provided at a rear end thereof. The rear side wall 9b has a circular hole, and a second tube 31 of a second resin member 30 (refer to FIG. 3) can be inserted through the hole. The cap 8b is attached to the opening 9a of the main body 8a. The cap 8b has an opening having a shape corresponding to the external shape of the connector 3. When the optical connector cable 1 is assembled, a distal end part of the connector 3 is disposed such that it protrudes to the outside of the cover 8 from the opening portion of the cap 8b.

Figure 3:
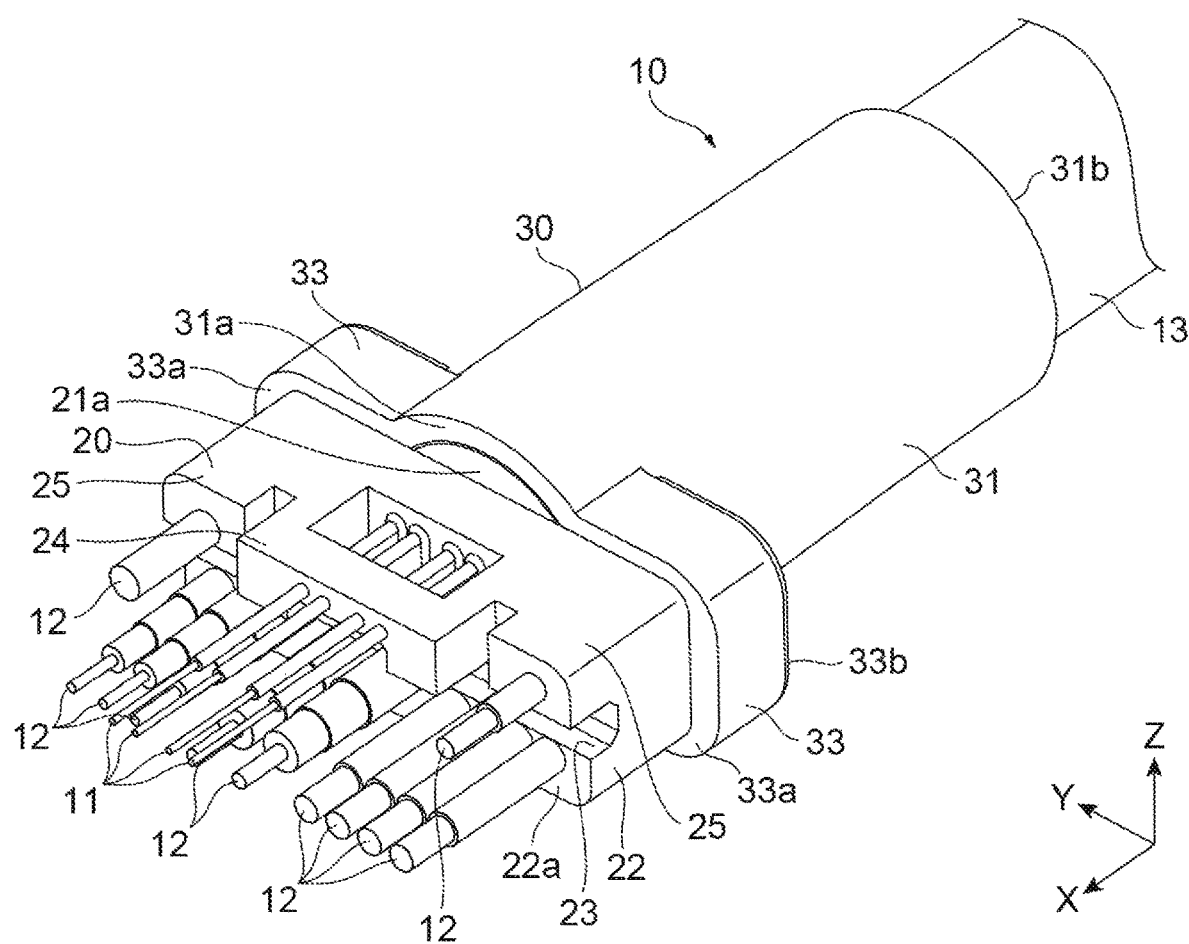
FIG. 3 is an enlarged perspective view of an end portion of an optical cable having a first resin member and a second resin member attached thereto.
Figure 4:
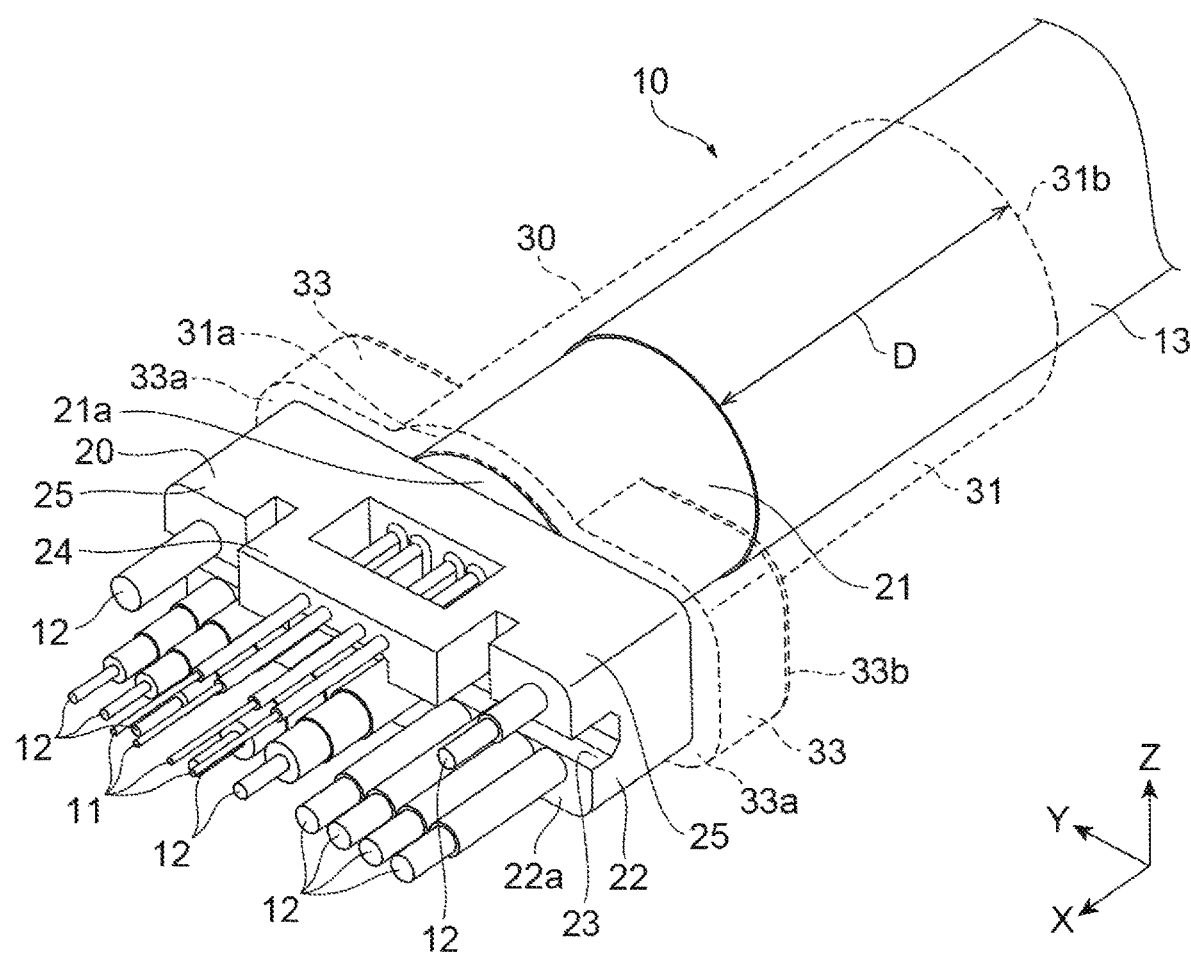
FIG. 4 is a view illustrating an internal structure in which the second resin member is indicated by a dashed line in the perspective view illustrated in FIG. 3.

With reference to FIGS. 3 and 4, a detailed constitution of the optical cable 10 will be described. FIG. 3 is an enlarged perspective view of an end portion of the optical cable 10 having the first resin member 20 and the second resin member 30 attached thereto. FIG. 4 is a view illustrating an internal structure in which the second resin member 30 is indicated by a dashed line in the perspective view illustrated in FIG. 3.

The optical cable 10 includes a plurality of optical fibers 11, a plurality of electrical wires 12, and a sheath 13 so as to transmit optical signals and electrical signals. Each of the optical fibers 11 transmits optical signals. In each of the optical fibers 11, a great part thereof is accommodated inside the sheath 13, and the end portion thereof extends to the outside from an end surface of the sheath 13. The plurality of optical fibers 11 are arranged inside the sheath 13 in a massed bundle state. Meanwhile, outside the sheath 13, the end portions of the plurality of optical fibers 11 are arranged in the direction Y in a one-dimensional state. Since the end portions of the plurality of optical fibers 11 are arranged in the direction Y, the optical cable 10 can be easily mounted on the substrate 4. A part of each of the optical fibers 11 extending from the end surface of the sheath 13 to a side outward from the sheath 13 (which will hereinafter be referred to as an outward extending part) is held by the first resin member 20. Transition of arrangement of the plurality of optical fibers 11 described above is performed inside the first resin member 20.

Each of the optical fibers 11 may be formed by coating glass fibers constituted of cores and claddings surrounding the cores with a resin. Each of the optical fibers 11 may be a single-mode optical fiber (SMF) or a multi-mode optical fiber (MMF). In the present embodiment, four optical fibers 11 are provided, but the number of optical fibers 11 is not limited.

Each of the electrical wires 12 transmits electrical signals. In each of the electrical wires 12, a great part thereof is accommodated inside the sheath 13, and the end portion thereof extends to the outside from the end surface of the sheath 13. The plurality of electrical wires 12 are arranged inside the sheath 13 in a two-dimensional state along a circumference surrounding the bundle of the plurality of optical fibers 11. Outside the sheath 13, the plurality of electrical wires 12 are arranged side by side in the direction Y. Since the end portions of the plurality of electrical wires 12 are arranged in the direction Y, the optical cable 10 can be easily mounted on the substrate 4. A part of each of the electrical wires 12 extending from the end surface of the sheath 13 to a side outward from the sheath 13 (which will hereinafter be referred to as an outward extending part) is held by the first resin member 20. Transition of arrangement of the plurality of electrical wires 12 described above is performed inside the first resin member 20.

Each of the electrical wires 12 may be a metal wire which is formed by coating a core wire formed of a metal material with a resin. In the present embodiment, eleven electrical wires 12 are provided, but the number of electrical wires 12 is not limited. The optical cable 10 includes the optical fibers 11 and the electrical wires 12, and is constituted as a photoelectric composite cable. The optical cable 10 may not include the electrical wires 12.

The sheath 13 is a resin coating that surrounds the plurality of optical fibers 11 and the plurality of electrical wires 12. The outer diameter of the sheath 13, that is, the cable diameter of the optical cable 10 may be within a range of 3 mm to 5 mm, for example. The optical cable 10 may further include tensile strength fibers. The tensile strength fibers may be provided in gaps between the plurality of optical fibers 11 and the plurality of electrical wires 12 inside the sheath 13. The tensile strength fibers may be aramid fibers having a very small diameter. For example, Kevlar (registered trademark) may be used as aramid fibers. The tensile strength fibers may be provided in a state in which a predetermined tensile force is applied thereto, and end portions thereof may be fixed to the first resin member 20.

Figure 5:
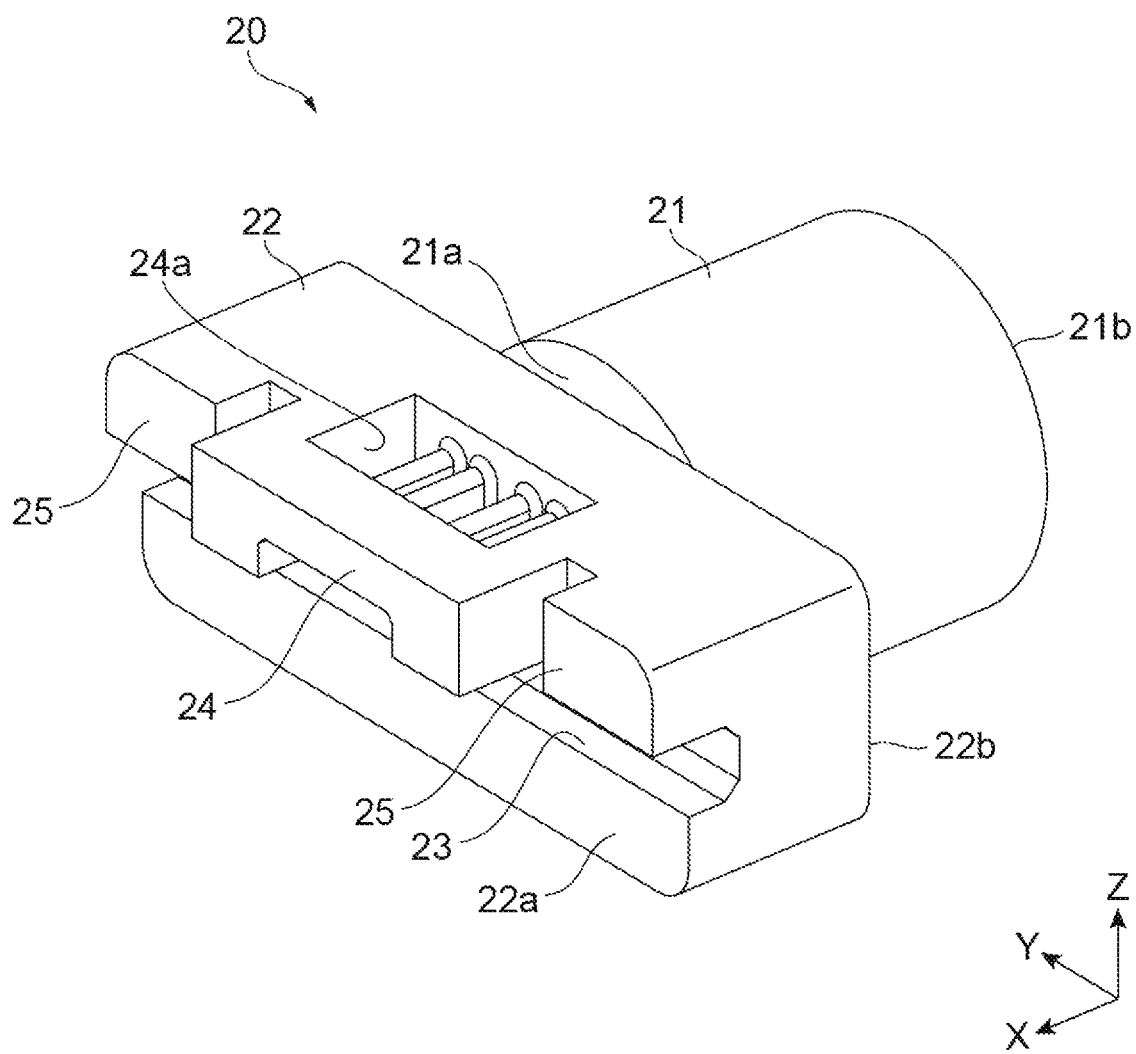
FIG. 5 is a perspective view illustrating the first resin member.

The first resin member 20 and the second resin member 30 are provided at the end portion of the optical cable 10. The first resin member 20 holds the outward extending part of each of the optical fibers 11 and the outward extending part of each of the electrical wires 12. The second resin member 30 covers at least a part of the first resin member 20 and the end portion of the sheath 13. A detailed constitution of the first resin member 20 will be described with reference to FIGS. 4 and 5. FIG. 5 is a perspective view illustrating the first resin member 20.

As illustrated in FIG. 4, the first resin member 20 is provided such that a region located close to the end surface of the sheath 13 of the outward extending parts of each of the optical fibers 11 and each of the electrical wires 12 (which will hereinafter be referred to as a rearward region) is covered. A region of the outward extending parts that is closer to the distal end than the rearward region (which will hereinafter be referred to as a front region) extends to the outside from the first resin member 20. The front region of each of the optical fibers 11 and each of the electrical wires 12 is connected to the wirings on the substrate 4 or the lens module 5. The first resin member 20 includes a first tube 21 and a main body 22. The first tube 21 is a member holding the outward extending part of each of the optical fibers 11 and the electrical wires 12 and is molded to have a cylindrical shape. As illustrated in FIG. 5, the first tube 21 has a front end surface 21a and a rear end surface 21b which is positioned opposite to the front end surface 21a in the direction X. As illustrated in FIG. 4, when the optical connector cable 1 is assembled, the rear end surface 21b contacts with the end surface of the sheath 13. The outer diameter of the first tube 21 has substantially the same size as the outer diameter of the sheath 13.

The main body 22 holds the outward extending part of each of the optical fibers 11 and the electrical wires 12 together with the first tube 21, and is molded to have substantially a rectangular parallelepiped shape. The main body 22 is provided such that the longitudinal direction thereof lies in the direction Y near the front end surface 21a of the first tube 21. As illustrated in FIG. 5, the main body 22 has a front end surface 22a and a rear end surface 22b. The front end surface 22a and the rear end surface 22b face each other in the direction X. The front end surface 22a has a groove portion 23 which is recessed toward an inward of the main body 22 (toward the rear end surface 22b). The groove 23 is provided in the direction Y, and the end portion of the substrate 4 is inserted therein. The groove 23 is formed to have a width in the direction Z slightly larger than the thickness of the substrate 4. The groove 23 and the end portion of the substrate 4 may be fixed to each other by a bonding agent.

A protruding portion 24 and a pair of protruding portions 25 are provided in a region of the front end surface 22a above the groove 23. The protruding portion 24 is provided at a central part on the front end surface 22a in the direction Y. The pair of protruding portions 25 are provided such that the protruding portion 24 is sandwiched therebetween in the direction Y. The protruding portion 24 is formed to have a length in the direction X longer than the length of each of the pair of protruding portions 25. The protruding portion 24 has a penetration window 24a which opens in a vertical direction of the first resin member 20. The plurality of optical fibers 11 are disposed such that they pass through an internal space of the penetration window 24a in the direction X. A part of each of the optical fibers 11 may be exposed to the outside through the penetration window 24a. Accordingly, the state of the plurality of optical fibers 11 in the main body 22 (for example, a positional relationship or the extending direction thereof) can be easily checked.

The rear end surface 22b of the main body 22 is a flat surface extending in the direction Y and the direction Z. When the optical connector cable 1 is assembled, the rear end surface 22b of the main body 22 contacts with front end surfaces 31a and 33a of the second resin member 30, which will be described below (refer to FIG. 4).

A plurality of penetration holes (not illustrated) allowing the plurality of optical fibers 11 and the plurality of electrical wires 12 to be inserted therethrough are provided inside the first resin member 20. One end of each of the penetration holes opens on the rear end surface 21b provided in the first tube 21. On the other hand, the other end of each of the penetration holes opens in a region of the front end surface 22a below the groove 23 and the distal end surfaces of the plurality of protruding portions 24 and 25 (refer to FIG. 4). Inside the first resin member 20, the arrangement of the plurality of optical fibers 11 and the plurality of electrical wires 12 varies. As described above, the plurality of optical fibers 11 and the plurality of electrical wires 12 are arranged in a massed bundle state inside the sheath 13 but they are subjected to transition so as to be arranged side by side in two rows in the direction Y inside the first resin member 20.

The first resin member 20 has a greater Young's modulus than the second resin member 30 which will be described below. For example, the Young's modulus of the first resin member 20 may be within a range of 250 MPa to 1,000 MPa. A Young's modulus is a value measured on the basis of the JIS standard JIS K7161. The material of the first resin member 20 may be a nylon resin, an epoxy resin, or the like. The first resin member 20 may be molded of a relatively hard resin material which is less likely to be deformed than the second resin member 30.

Figure 6:
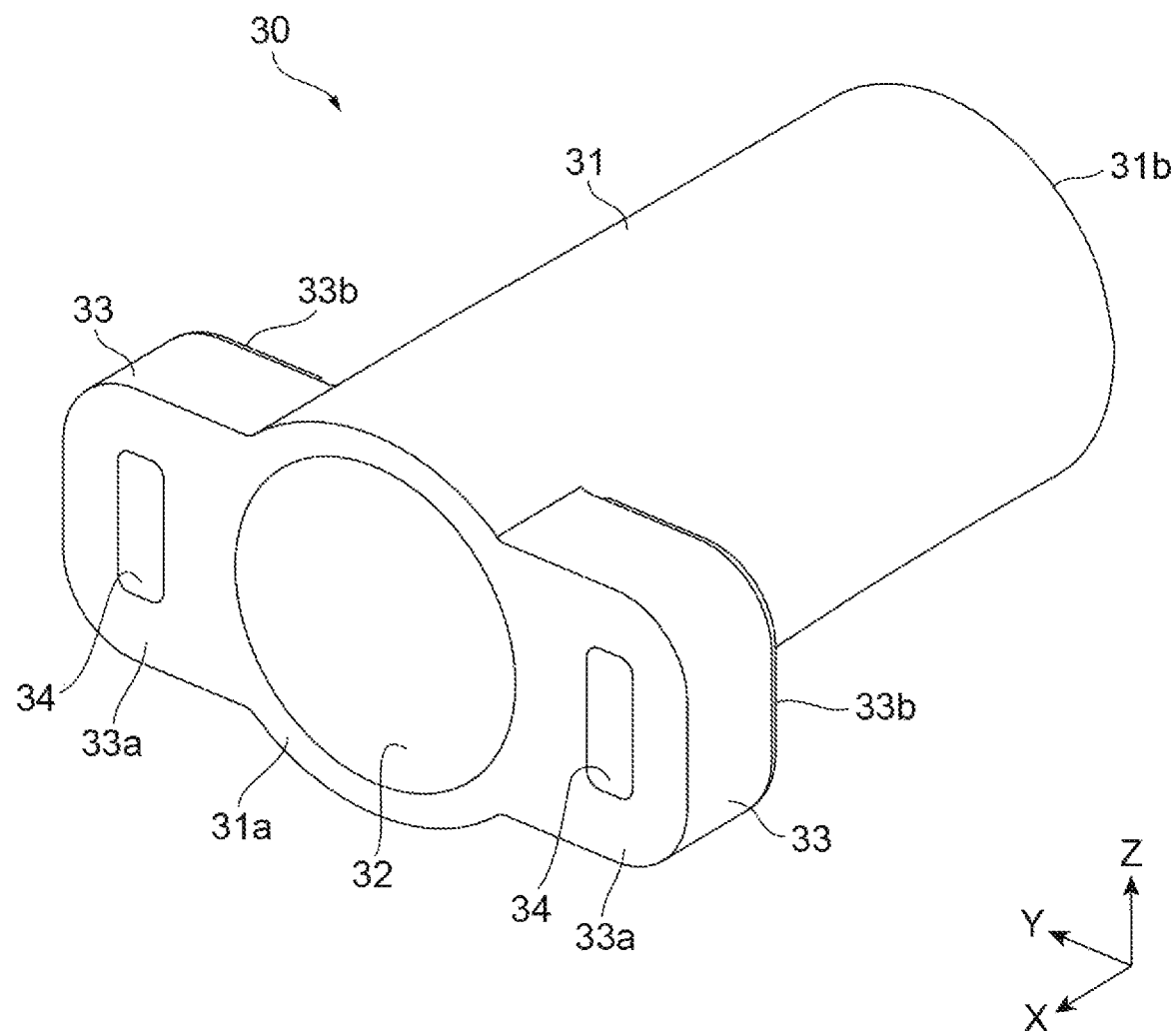
FIG. 6 is a perspective view illustrating the second resin member.

A detailed constitution of the second resin member 30 will be described with reference to FIGS. 3, 4, and 6. FIG. 6 is a perspective view illustrating the second resin member 30. As illustrated in FIG. 4, the second resin member 30 is provided such that the first tube 21 of the first resin member 20 and the end portions of the sheath 13 are covered. The second resin member 30 includes the second tube 31 and a pair of protruding portions 33. The second tube 31 is a member having a cylindrical shape extending in the direction X. As illustrated in FIG. 6, the second tube 31 includes the front end surface 31a and a rear end surface 31b which is positioned opposite to the front end surface 31a in the direction X. The front end surface 31a contacts with the rear end surface 22b (refer to FIG. 5) provided in the main body 22 of the first resin member 20.

An insertion portion 32 is provided inside the second resin member 30. The insertion portion 32 is a space having a columnar shape provided in the direction X, and connects the front end surface 31a and the rear end surface 31b to each other. As illustrated in FIG. 4, the first tube 21 of the first resin member 20 and the end portions of the sheath 13 are inserted through the insertion portion 32. In this state, a contact part between the rear end surface 21b of the first tube 21 and the end surface of the sheath 13 is positioned inside the insertion portion 32. A length D in the direction X of a part in which the second tube 31 of the second resin member 30 and the sheath 13 overlap each other (a length from the end surface of the sheath 13 to the rear end surface 31b of the second tube 31) may be 5 mm or longer and is preferably 6.5 mm or longer. The longer the length D, the larger the area in which the second resin member 30 and the sheath 13 come into contact with each other so that the strength with respect to bending of the optical connector cable 1 is improved.

The pair of protruding portions 33 protrude from an outer surface of a front end portion of the second tube 31 to a side outward from the second tube 31. The pair of protruding portions 33 protrude in directions opposite to each other in the direction Y. Each of the protruding portions 33 has the front end surface 33a and a rear end surface 33b which is positioned opposite to the front end surface 33a in the direction X. The front end surface 33a is a flat surface which continues to the front end surface 31a of the first tube 21. The front end surface 33a contacts with the rear end surface 22b (refer to FIG. 5) provided in the main body 22 of the first resin member 20.

The protruding portions 33 respectively have penetration holes 34. Each of the penetration holes 34 connects the front end surface 33a and the rear end surface 33b to each other. When the optical connector cable 1 is assembled, the rear end surfaces 33b of the protruding portions 33 contact with an inner surface of the rear wall 9b provided in the main body 8a of the cover 8 (refer to FIG. 2). A pair of projecting portions (not illustrated) protruding forward are provided on the inner surface of the rear wall 9b. Each of the pair of projecting portions provided on the inner surface of the rear wall 9b is inserted into each of the penetration holes 34 provided in the second resin member 30. Accordingly, inside the cover 8, deviation of positions of various members such as the first resin member 20 connected to the second resin member 30 and the second resin member 30 can be prevented.

The second resin member 30 has a smaller Young's modulus than the first resin member 20. For example, the Young's modulus of the second resin member 30 may be within a range of 10 MPa to 150 MPa. A Young's modulus is a value measured on the basis of the JIS standard JIS K7161. For example, the material of the second resin member 30 may be a polyvinyl chloride resin (PVC) or the like. The second resin member 30 may be molded of a relatively soft resin material which is softer than that of the first resin member 20.

A method for manufacturing the optical connector cable 1 will be described. First, a method for molding the first resin member 20 at the end portion of the optical cable 10 will be described. The first resin member 20 is subjected to injection molding using a molding resin. When the first resin member 20 is molded, first, a part of the sheath 13 corresponding to a predetermined length is eliminated on one end of the optical cable 10, and the plurality of optical fibers 11 and the plurality of electrical wires 12 are caused to extend to the outside from the end surface of the sheath 13. Subsequently, the end portion of the optical cable 10 is disposed in a first mold (not illustrated) having a fixing mechanism for fixing the outward extending part of each of the optical fibers 11 and the electrical wires 12 to a part at a desired position. In this state, the first resin member 20 is molded by filling a resin injection region of the first mold with a melted molding resin. After a lapse of a predetermined cooling period, the optical cable 10 having the first resin member 20 attached thereto is taken out from the first mold. The first tube 21 and the main body 22 are integrally molded. The first resin member 20 is molded by the method described above.

Next, a method for molding the second resin member 30 at the end portion of the optical cable 10 will be described. The second resin member 30 is subjected to injection molding using a molding resin. When the second resin member 30 is molded, first, the optical cable 10 having the first resin member 20 attached thereto is prepared. Further, the end portion of the optical cable 10 is disposed in a second mold (not illustrated) having a fixing mechanism for fixing the optical cable 10 to a part at a desired position. At this time, the end portions of the first resin member 20 and the sheath 13 are positioned within a resin injection region of the second mold. Accordingly, the contact part between the rear end surface 21b of the first tube 21 and the end surface of the sheath 13 is positioned within the resin injection region of the second mold. In this state, the second resin member 30 is molded by filling the resin injection region of the second mold with a melted molding resin. After a lapse of a predetermined cooling period, the optical cable 10 having the second resin member 30 attached thereto is taken out from the second mold. The second tube 31 and the protruding portions 33 are integrally molded. The second resin member 30 is molded by the method described above. The second resin member 30 formed in this manner is fixed to the outer circumference of the first tube 21 of the first resin member 20, and both are integrated.

Thereafter, as illustrated in FIG. 2, each of the optical fibers 11 and each of the electrical wires 12 provided in the optical cable 10 are connected to the wirings on the substrate 4 or the lens module 5. Next, the substrate 4, the first resin member 20, and the like are accommodated in the accommodation members 6 and 7. Further, the cover 8 is attached such that a part of the accommodation members 6 and 7 and the second resin member 30 is covered. This completes steps of manufacturing the optical connector cable 1.

In the optical connector cable 1 according to the present embodiment, breakage of the optical connector cable 1 due to pulling and bending can be prevented by combining different materials of the first resin member 20 and the second resin member 30.

In the present embodiment, the second resin member 30 has the Young's modulus smaller than the Young's modulus of the first resin member 20. In this case, the end portions of the plurality of optical fibers 11 extending to the outside from the end surface of the sheath 13 is held by the first resin member 20 having a greater Young's modulus. Accordingly, the first resin member 20 holding the end portions of the optical fibers 11 is unlikely to be deformed when the optical connector cable 1 is pulled. Therefore, the optical fibers 11 are unlikely to come out from the first resin member 20. Meanwhile, at least a part of the first resin member 20 and the end portion of the sheath 13 are covered by the second resin member 30 having a smaller Young's modulus. Accordingly, since the second resin member 30 which is softer than the first resin member 20 and is likely to be deformed contacts with the sheath 13 of the optical cable 10 when the optical connector cable 1 is bent, damage to the sheath 13 and the optical fibers 11 accommodated inside the sheath 13 is prevented. That is, breakage of the optical connector cable 1 due to pulling and bending can be prevented by forming resin members to be attached to the end portion of the optical cable 10 using a plurality of resin members having different Young's moduli.

In the present embodiment, the first resin member 20 includes the first tube 21 surrounding the end portions of the plurality of optical fibers 11 extending to the outside from the end surface of the sheath 13. The end surface of the sheath 13 contacts with the rear end surface 21b of the first tube 21. The second resin member 30 includes the second tube 31 covering the contact part between the rear end surface 21b of the first tube 21 and the end surface of the sheath 13. In this case, not only the rear end surface 21b of the first tube 21 and the end surface of the sheath 13 surrounding the optical fibers 11 come into contact with each other, but the contact part between the end surfaces thereof is also covered by the second resin member 30. Accordingly, exposed parts of the optical fibers 11 can be reduced, and thus damage to the optical fibers 11 can be prevented.

In the present embodiment, the first resin member 20 may has the Young's modulus within a range of 250 MPa to 1,000 MPa. The second resin member 30 may has the Young's modulus within a range of 10 MPa to 150 MPa. In this case, since the first resin member 20 has a relatively greater Young's modulus and is unlikely to be deformed, the optical fibers 11 are unlikely to come out from the first resin member 20 when the optical connector cable 1 is pulled. In addition, since the second resin member 30 is a soft resin member which has a relatively smaller Young's modulus, the sheath 13 of the optical cable 10 and the optical fibers 11 inside the sheath 13 are unlikely to be damaged when the optical connector cable 1 is bent. Thus, breakage of the optical connector cable 1 due to pulling and bending can be prevented.

In the present embodiment, the first resin member 20 may be molded of a resin having nylon as a main component, and the second resin member 30 may be molded of a resin having polyvinyl chloride as a main component. In this case, since the first resin member 20 is molded of a nylon resin which is unlikely to be deformed, the optical fibers 11 are unlikely to come out from the first resin member 20 when the optical connector cable 1 is pulled. In addition, since the second resin member 30 is molded of a polyvinyl chloride resin which is generally softer than a nylon resin, the sheath 13 of the optical cable 10 and the optical fibers 11 inside the sheath 13 are unlikely to be damaged when the optical connector cable 1 is bent. That is, breakage of the optical connector cable 1 due to pulling and bending can be prevented. Regarding a nylon resin contained in the first resin member 20 and a polyvinyl chloride resin contained in the second resin member 30, the Young's moduli or other physical properties can be suitably adjusted by blending other resins or adding an additive.

In the present embodiment, the optical cable 10 includes the plurality of electrical wires 12. The end portions of the plurality of electrical wires 12 extend to the outside from the end surface of the sheath 13. The first resin member 20 holds the end portions of the plurality of optical fibers 11 and the end portions of the plurality of electrical wires 12. In this case, the end portions of the electrical wires 12 are held by the first resin member 20 which has a greater Young's modulus than the second resin member 30 and is unlikely to be deformed. Accordingly, the electrical wires 12 are unlikely to come out from the first resin member 20 when the optical connector cable 1 is pulled. Meanwhile, the second resin member 30 is a soft member which has a smaller Young's modulus than the first resin member 20. Therefore, damage to the electrical wires 12 accommodated in the sheath 13 of the optical cable 10 can be prevented when the optical connector cable 1 is bent.

In the method for manufacturing the optical connector cable 1 according to the embodiment of the present disclosure, after the first resin member 20 is molded, the second resin member 30 covering at least a part of the first resin member 20 and the end portion of the sheath 13 is subjected to injection molding. Thus, the second resin member 30 is provided such that it adheres to the surface of the first resin member 20. Accordingly, mechanical strength of the optical connector cable 1 can be improved.

First Modification Example

Figure 7:
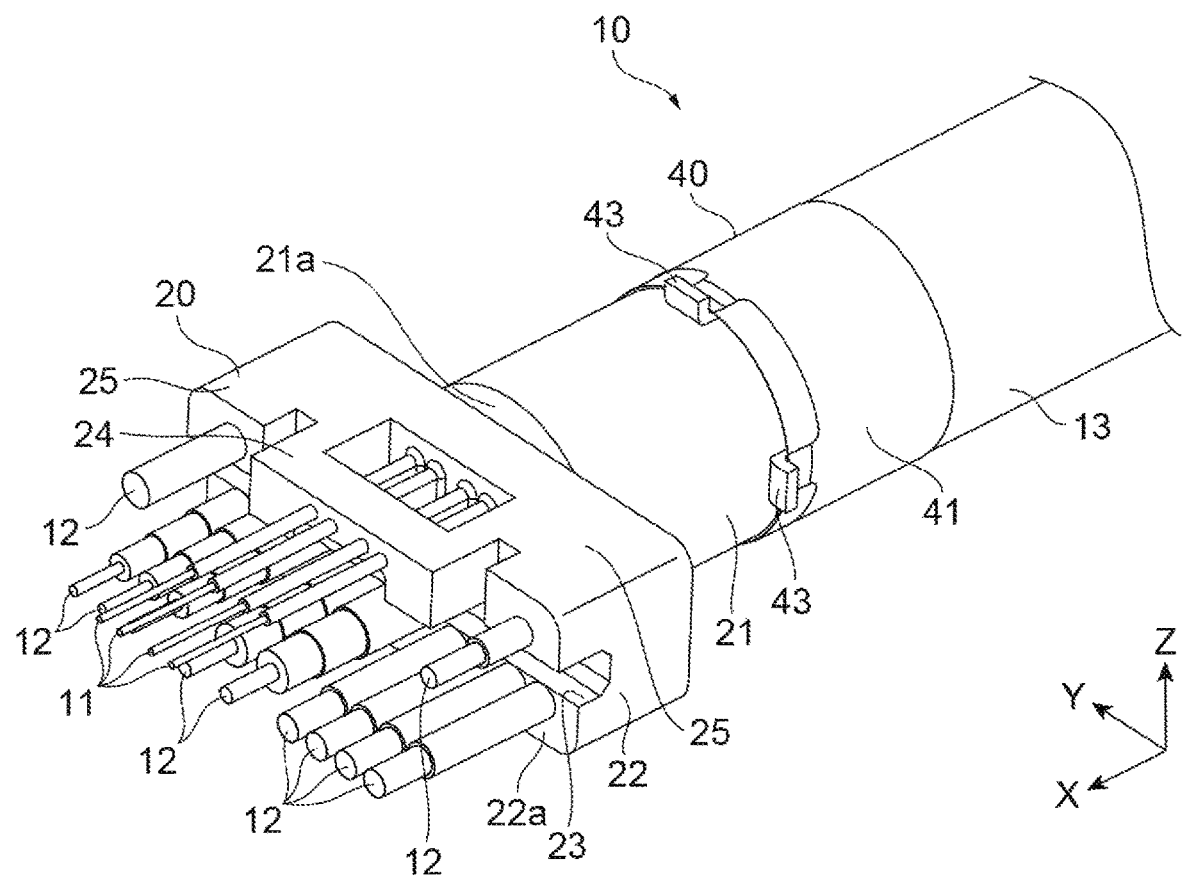
FIG. 7 is an enlarged perspective view of an end portion of an optical cable provided in an optical connector cable according to a first modification example.
Figure 8:
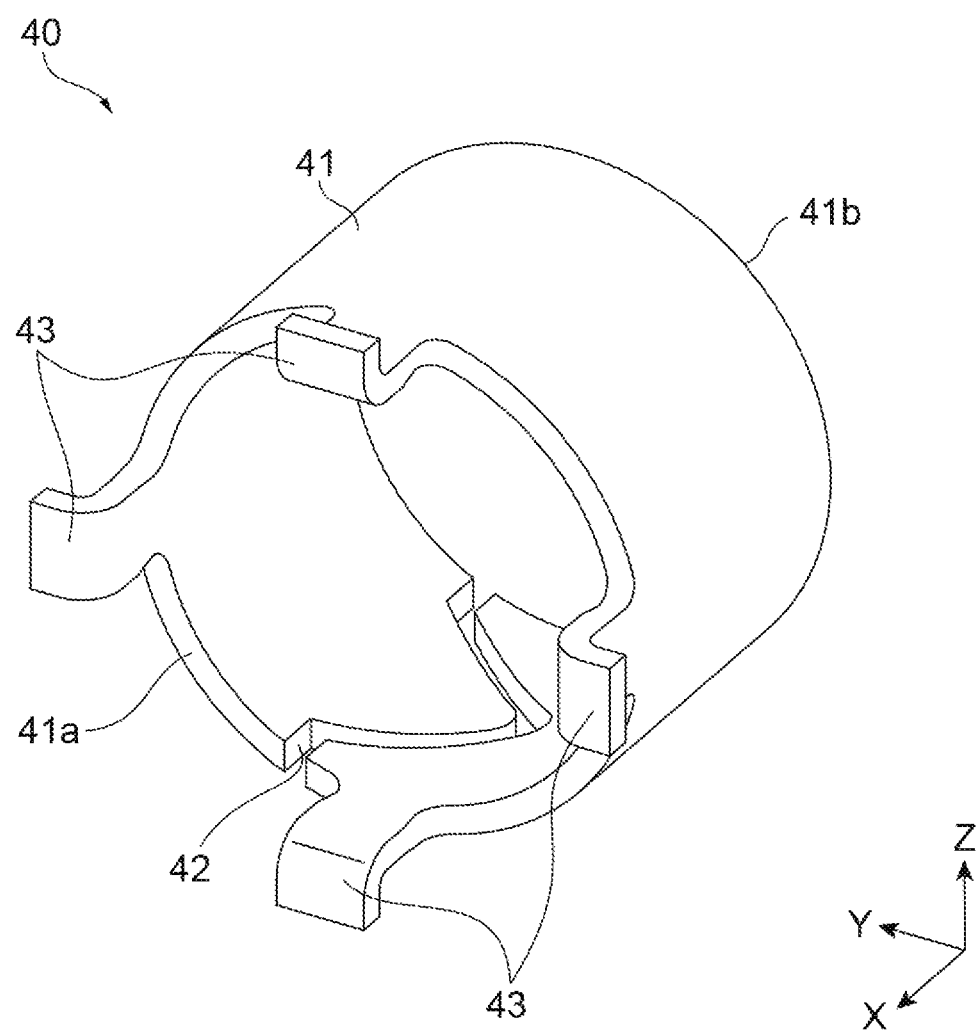
FIG. 8 is a perspective view illustrating a ring member attached to the optical cable illustrated in FIG. 7.

With reference to FIGS. 7 and 8, a first modification example of the optical connector cable 1 will be described. FIG. 7 is an enlarged perspective view of the end portion of the optical cable 10 provided in an optical connector cable according to the first modification example. FIG. 8 is a perspective view illustrating a ring member 40 attached to the optical cable 10. FIG. 7 illustrates the optical cable 10 in a state before the second resin member 30 is molded, that is, a state in which the first resin member 20 is molded. In the following description, points different from the foregoing embodiment will be described, and description for common points may be omitted.

The optical connector cable according to the first modification example differs from the optical connector cable 1 according to the embodiment described above in that the ring member 40 is attached to the end portion of the optical cable 10. The ring member 40 is an annular member which is attached to a part around the end portion of the sheath 13. As illustrated in FIG. 8, the ring member 40 includes an annular portion 41 and a plurality of projecting portions 43.

The annular portion 41 is a cylindrical member having a predetermined length in the direction X. As illustrated in FIG. 7, the optical cable 10 is inserted through the inside of the annular portion 41, and an inner surface of the annular portion 41 adhere to the surface of the sheath 13. The annular portion 41 may be fixed such that it slightly bites the sheath 13 through caulking performed by a manufacturer of the optical connector cable or may be disposed such that it is simply wound around the sheath 13 without being caulked.

As illustrated in FIG. 8, the annular portion 41 has a front end surface 41*a* and a rear end surface 41*b* which is positioned opposite to the front end surface 41*a* in the direction X. In addition, the annular portion 41 includes a gap 42 connecting the front end surface 41*a* and the rear end surface 41*b* to each other. Accordingly, the inner diameter of the annular portion 41 can be slightly adjusted in accordance with the outer diameter of the sheath 13 (the cable diameter of the optical cable 10) to which the annular portion 41 is attached. The gap 42 has a shape inclined with respect to the direction X (V-shape). Accordingly, end portions of the annular portion 41 positioned with the gap 42 sandwiched therebetween can be prevented from excessively deviating from each other in the direction X. The gap 42 may have a linear shape extending in the direction X.

The projecting portions 43 have a shape which extends in the direction X from the front end surface 41*a* and is then curved to a side outward from the ring member 40. When the ring member 40 is attached to the optical cable 10, as illustrated in FIG. 7, distal end parts of the projecting portions 43 protrude outward from the optical cable 10. The distal end parts of the projecting portions 43 are positioned such that they are slightly overlap by the end portion of the first tube 21. As stated in the description of the foregoing embodiment, the second resin member 30 is provided such that the end portion of the sheath 13 is covered (refer to FIG. 4). In the present modification example, the second resin member 30 is provided such that the ring member 40 and the end portion of the sheath 13 are covered.

The method for molding the second resin member 30 is similar to the method stated in the description of the foregoing embodiment. Specifically, the second resin member 30 is molded by disposing the end portion of the optical cable 10 having the ring member 40 attached thereto in the second mold described above and filling the resin injection region of the second mold with a melted molding resin. Accordingly, the projecting portions 43 of the ring member 40 are embedded inside the second resin member 30. The ring member 40 may be attached to the optical cable 10 before the first resin member 20 is formed.

The ring member 40 may be formed of a metal, and the annular portion 41 and the plurality of projecting portions 43 may be integrally molded. As illustrated in FIG. 8, regarding the plurality of projecting portions 43, four projecting portions are provided at equal intervals in a circumferential direction of the front end surface 41*a*, but the number and positions of projecting portions 43 are not limited. For example, only one projecting portion 43 may be provided.

Hereinabove, the optical connector cable according to the present modification example includes the ring member 40 surrounding the end portion of the sheath 13. The ring member 40 includes the projecting portions 43 protruding outward. The second resin member 30 covers the projecting portions 43. In this case, the projecting portions 43 of the ring member 40 are caught by the second resin member 30, and thus the second resin member 30 can be prevented from falling off from the end portion of the sheath 13.

In the present modification example, a plurality of projecting portions 43 are provided in the circumferential direction of the ring member 40. In this case, the second resin member 30 can be better prevented from falling off from the end portion of the sheath 13.

Second Modification Example

Figure 9:
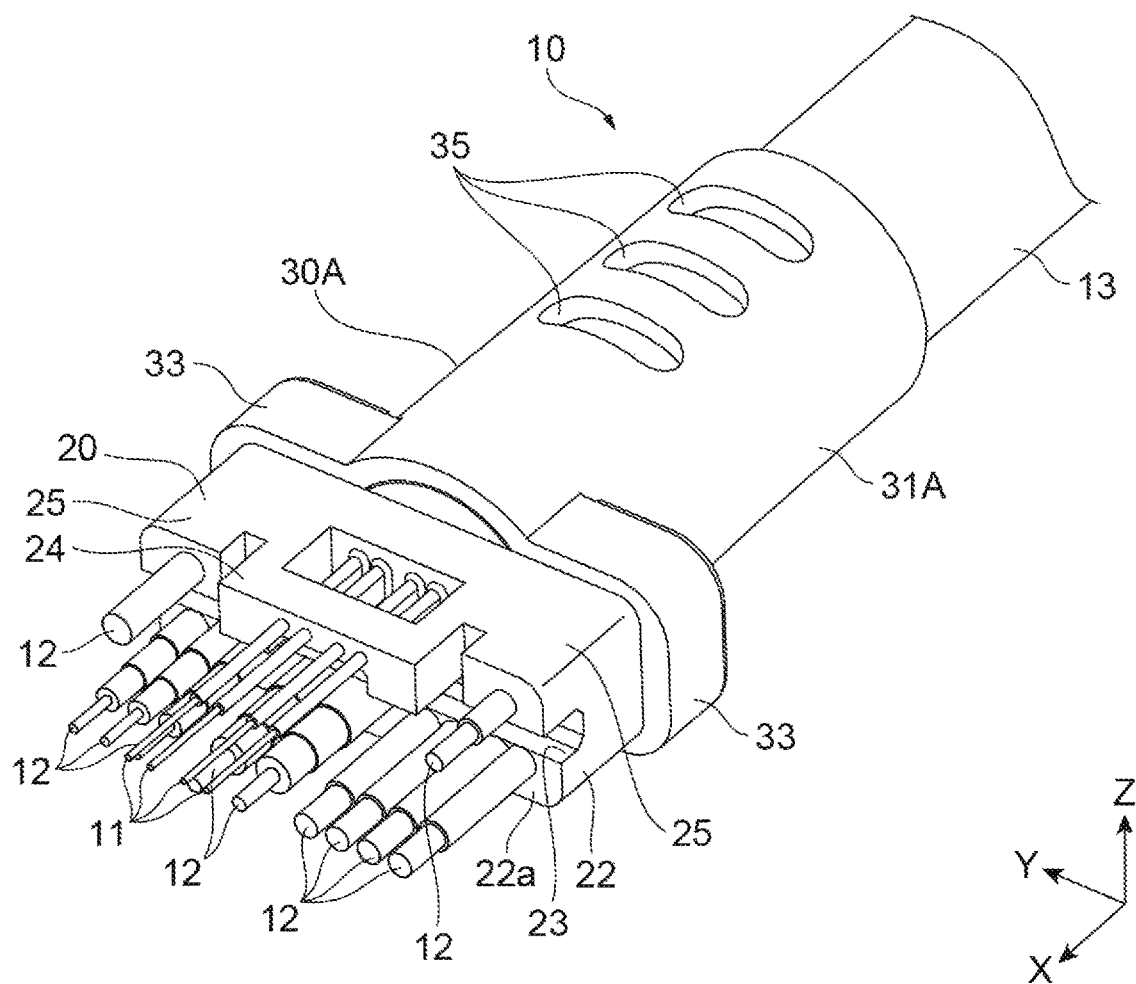
FIG. 9 is an enlarged perspective view of an end portion of an optical cable provided in an optical connector cable according to a second modification example.

With reference to FIG. 9, a second modification example of the optical connector cable 1 will be described. FIG. 9 is an enlarged perspective view of the end portion of the optical cable 10 provided in an optical connector cable according to the second modification example. In the following description, points different from the foregoing embodiment will be described, and description for common points may be omitted.

The optical connector cable according to the second modification example differs from the optical connector cable 1 according to the embodiment described above in that a second resin member 30A has a plurality of holes 35. In the present modification example, four holes 35 are provided in the second resin member 30A. The plurality of holes 35 are provided side by side in the direction X in a second tube 31A of the second resin member 30A. Each of the holes 35 penetrates the second tube 31A from the outer surface toward the inner surface thereof. That is, in a state in which the optical cable 10 is inserted through the inside of the second tube 31A, a part on the surface of the sheath 13 is exposed through each of the holes 35. A bonding portion constituted of a bonding agent may be provided inside each of the holes 35, and the second resin member 30A is fixed to the sheath 13.

The number and positions of holes 35 are not limited. For example, the plurality of holes 35 may be respectively provided above and below the second tube 31A such that the optical cable 10 is sandwiched therebetween in the direction Z. The cross-sectional shape of each of the holes 35 in the present modification example is a rectangular shape with rounded corners (a shape surrounded by two parallel lines having lengths equivalent to each other and two semi-circles), but the cross-sectional shape is not limited. For example, it may be a rectangular shape.

Hereinabove, in the optical connector cable according to the present modification example, the second resin member 30A includes the holes 35 for exposing a part on the surface of the sheath 13. A bonding portion for fixing the second resin member 30A and the sheath 13 is provided in the holes 35. In this case, since the second resin member 30A and the sheath 13 are fixed by the bonding portion, the second resin member 30A can be prevented from falling off from the end portion of the sheath 13.

In the present modification example, a plurality of holes 35 are provided in the extending direction of the optical cable 10. In this case, bonding agents can be provided in a plurality of holes 35, and thus the second resin member 30A can be more firmly fixed to the sheath 13. Accordingly, the second resin member 30A can be better prevented from falling off from the end portion of the sheath 13.

Hereinabove, the embodiment according to the present disclosure has been described in detail, but the present disclosure is not limited to the foregoing embodiment and can be applied to various embodiments.

For example, the ring member 40 described in the first modification example has the projecting portions 43 on the front end surface 41a but may have projecting portions on an outer surface of the annular portion 41. In addition, the ring member 40 may not have the projecting portions 43 and may have recessed portions recessed to an inward side of the ring member 40. In this case, the second resin member 30 and the ring member 40 may be fixed to each other by causing a part of the second resin member 30 to enter the recessed portions.

What is claimed is:

1. An optical connector cable comprising:
   an optical cable that includes a plurality of optical fibers and a sheath surrounding the plurality of optical fibers, wherein end portions of the plurality of optical fibers extend to outside of an end surface of the sheath;
   a first resin member that holds the end portions of the plurality of optical fibers extending to outside of the end surface of the sheath; and
   a second resin member that covers at least a part of the first resin member and an end portion of the sheath, wherein
   the first resin member includes a first tube surrounding the end portions of the plurality of optical fibers extending to outside of the end surface of the sheath,
   an end surface of the first tube contacts with the end surface of the sheath, and
   the second resin member includes a second tube surrounding a contact part between the end surface of the first tube and the end surface of the sheath.

2. The optical connector cable according to claim 1, wherein the second resin member has a Young's modulus smaller than a Young's modulus of the first resin member.

3. The optical connector cable according to claim 1, wherein a length of a portion of the second tube overlapping the sheath in an extending direction is 5 mm or longer.

4. The optical connector cable according to claim 1, wherein the second resin member further includes a pair of protruding portions protruding outward from an outer surface of a front end portion of the second tube, and
   wherein the pair of protruding portions come into surface contact with the first resin member.

5. The optical connector cable according to claim 1, wherein the first resin member has a Young's modulus within a range of 250 MPa to 1,000 MPa, and
   wherein the second resin member has a Young's modulus within a range of 10 MPa to 150 MPa.

6. The optical connector cable according to claim 1, wherein the first resin member is made of a nylon resin, and
   wherein the second resin member is made of a polyvinyl chloride resin.

7. The optical connector cable according to claim 1, wherein each of distal end portions of the plurality of optical fibers protrudes outward from an end surface of the first resin member, and
   wherein the first resin member is provided with a groove extending in a direction in which the distal end portions of the plurality of optical fibers are arranged, the groove being recessed toward the second resin member.

8. The optical connector cable according to claim 7, wherein the optical cable further includes a plurality of electrical wires, and each of distal end portions of the plurality of electrical wires protrudes outward from the end surface of the first resin member, and
   wherein the groove is positioned between the distal end portions of the plurality of optical fibers and the distal end portions of the plurality of electrical wires when the end surface of the first resin member is viewed from the front.

9. The optical connector cable according to claim 1,
wherein each of distal end portions of the plurality of optical fibers protrudes outward from an end surface of the first resin member, and
wherein the first resin member includes a first protruding portion that includes a region in which each of the distal end portions of the plurality of optical fibers protrudes and protrudes outward, and a pair of second protruding portions that is provided such that the first protruding portion is sandwiched therebetween in a direction in which the distal end portions of the plurality of optical fibers are arranged and protrudes outward.

10. The optical connector cable according to claim 1,
wherein each of distal end portions of the plurality of optical fibers protrudes outward from an end surface of the first resin member, and
wherein the first resin member is provided with a window configured to expose a region of the end portions of the plurality of optical fibers excluding each of the distal end portions protruding outward.

11. The optical connector cable according to claim 1 further comprising:
a ring member that surrounds the end portion of the sheath, wherein the ring member includes a projecting portion protruding outward, and the second resin member covers the projecting portion.

12. The optical connector cable according to claim 1,
wherein the second resin member is provided with a hole configured to expose a part of a surface of the sheath, and bonding portion to fix the second resin member to the sheath is provided in the hole.

13. The optical connector cable according to claim 1,
wherein the optical cable further includes a plurality of electrical wires, and end portions of the plurality of electrical wires extend to outside of the end surface of the sheath, and
wherein the first resin member holds the end portions of the plurality of optical fibers and the end portions of the plurality of electrical wires.

14. The optical connector cable according to claim 1 further comprising:
a lens module configured to have each of distal end portions of the plurality of optical fibers protruding from an end surface of the first resin member placed thereon;
a substrate on which the lens module is disposed; and
a connector attached to an end portion of the substrate.

15. A method for manufacturing the optical connector cable according to claim 1, the method comprising:
preparing the optical cable including the plurality of optical fibers and the sheath surrounding the plurality of optical fibers so that the end portions of the plurality of optical fibers extend to outside of the end surface of the sheath;
disposing the end portions of the plurality of optical fibers extending outside of the end surface of the sheath inside a first mold;
molding the first resin member that holds the end portions of the plurality of optical fibers by filling the first mold with a first molding resin;
disposing at least a part of the first resin member and the end portion of the sheath inside a second mold; and
molding the second resin member that covers at least a part of the first resin member and the end portion of the sheath by filling the second mold with a second molding resin.

16. The method for manufacturing an optical connector cable according to claim 15,
wherein the second resin member has a Young's modulus smaller than a Young's modulus of the first resin member.

17. An optical connector cable comprising:
an optical cable that includes a plurality of optical fibers and a sheath surrounding the plurality of optical fibers, wherein end portions of the plurality of optical fibers extend to outside of an end surface of the sheath;
a first resin member that holds the end portions of the plurality of optical fibers extending to outside of the end surface of the sheath; and
a second resin member that covers at least a part of the first resin member and an end portion of the sheath, wherein
the first resin member is made of a nylon resin, and
the second resin member is made of a polyvinyl chloride resin.

18. An optical connector cable comprising:
an optical cable that includes a plurality of optical fibers and a sheath surrounding the plurality of optical fibers, wherein end portions of the plurality of optical fibers extend to outside of an end surface of the sheath;
a first resin member that holds the end portions of the plurality of optical fibers extending to outside of the end surface of the sheath; and
a second resin member that covers at least a part of the first resin member and an end portion of the sheath, wherein
each of distal end portions of the plurality of optical fibers protrudes outward from an end surface of the first resin member, and
the first resin member is provided with a window configured to expose a region of the end portions of the plurality of optical fibers excluding each of the distal end portions protruding outward.

* * * * *